(12) United States Patent
Frank

(10) Patent No.: US 7,441,826 B2
(45) Date of Patent: Oct. 28, 2008

(54) ENERGY TRANSFER BEAM FOR AUTOMOTIVE SIDE DOOR

(75) Inventor: Randy Frank, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/650,750

(22) Filed: Jan. 8, 2007

(65) Prior Publication Data

US 2008/0164716 A1 Jul. 10, 2008

(51) Int. Cl.
*B60J 5/00* (2006.01)
(52) U.S. Cl. .............................. 296/146.6; 296/187.12
(58) Field of Classification Search .............. 296/146.6, 296/187.12, 187.03; 49/502
See application file for complete search history.

(56) References Cited

U.S. PATENT DOCUMENTS

| | | | | |
|---|---|---|---|---|
| 4,090,734 A | * | 5/1978 | Inami et al. ............... | 296/146.6 |
| 4,488,751 A | | 12/1984 | Kling .......................... | 296/146 |
| 5,056,861 A | * | 10/1991 | Garnweidner et al. .. | 296/187.12 |
| 5,110,176 A | | 5/1992 | Curtis ......................... | 296/188 |
| 5,404,690 A | * | 4/1995 | Hanf .......................... | 52/735.1 |
| 5,580,119 A | * | 12/1996 | Uchida et al. ............. | 296/146.6 |
| 5,785,376 A | * | 7/1998 | Nees et al. ................. | 296/146.6 |
| 5,820,202 A | | 10/1998 | Ju .............................. | 296/146.6 |
| 5,984,402 A | * | 11/1999 | Takeuchi ................. | 296/187.12 |
| 6,382,707 B1 | | 5/2002 | Dunneback .............. | 296/146.6 |
| 6,758,491 B2 | | 7/2004 | Fischer ..................... | 280/730.2 |
| 6,877,796 B2 | | 4/2005 | Kimura ................... | 296/187.13 |
| 6,923,492 B2 | | 8/2005 | Okazaki ................... | 296/146.6 |
| 6,926,340 B2 | | 8/2005 | Moriyama ............... | 296/146.6 |
| 7,014,249 B2 | | 3/2006 | Karuppaswamy ........ | 296/146.6 |

\* cited by examiner

*Primary Examiner*—Dennis H Pedder
(74) *Attorney, Agent, or Firm*—Frederick Owens; Miller Law Group, PLLC

(57) ABSTRACT

A side door impact reinforcement beam incorporates a cantilevered member that is welded at one end thereof internally of the impact reinforcement beam and projects forwardly thereof. Upon side impact, the bending of the impact reinforcement beam deploys the cantilevered member outwardly from within the section of the reinforcement beam to strike an energy transfer block placed on a forward portion of the inner door panel to engage the outwardly projecting cantilevered member and receive impact energy therefrom. In a preferred embodiment, the reinforcement beam has a hat-shaped cross-sectional configuration that is formed with a pipe welded at a rearward portion thereof to project forwardly to be positioned for engagement with the energy transfer block when projected outwardly during impact bending of the reinforcement beam. The energy transfer from the outwardly deploying cantilevered pipe directs impact loads away from the pelvic region of the occupant toward the femur region.

19 Claims, 4 Drawing Sheets

ENERGY TRANSFER BEAM FOR AUTOMOTIVE SIDE DOOR

FIELD OF THE INVENTION

This invention relates generally to a side door assembly in an automotive vehicle and, more particularly, to an impact beam within the side door to direct crash energy toward the forward structure of the door.

BACKGROUND OF THE INVENTION

The Insurance Institute for Highway Safety (IIHS) side impact requirements poses a big challenge for automobile manufacturers. The Insurance Institute for Highway Safety has tested many vehicles, ranging from small cars to large sports utility vehicles. Achieving exceptional ratings in these tests have been a challenge. The problem recognized with the testing by the Insurance Institute for Highway Safety (IIHS) is a much heavier IIHS barrier (1500 kg vs. 1370 kg for FMVSS214 testing procedures) crashes into vehicles at 50 kilometers per hour (kph) and the sides of vehicles have not been effective in dissipating the energy of the barrier before the vehicle interior impacts the occupants. One approach to attain better safety performance in the IIHS testing procedure is to add reinforcement to vehicle sides, while another approach is to change the crash dummy kinematics.

One perceived problem is that severe intrusion by the impact barrier will overwhelm any small design changes; therefore, some other mechanism will be needed in order to put significant impediment forces on the impact barrier to reduce the speed and dynamic crush of the impact barrier, and at the same time divert the crash energy away from the occupants. In an IIHS side impact event, the thorax region of the crash dummy is pushed further inboard than the pelvis area of the crash dummy under conventional vehicle door structure, thereby causing the lower spine of the crash dummy to bend. The upper body of the crash dummy drags the lower body to move inboard. Since the lower body represents a large portion of the crash dummy weight, the thorax and abdomen rib regions are under severe pressure to deform. Most vehicles are rated poorly on the IIHS side impact tests because of excessive rib deflections.

Pelvis pusher blocks are widely used to push the pelvis region of the crash dummy further inboard to release the pressure in the thorax and abdomen areas. The pelvis pusher block is typically made from soft foam, i.e. foams of 25 or 30 psi, and is mounted internally of the side door. Pusher blocks, however, do not operate to divert the crash energy away from the occupant.

A cylindrical tubular reinforcement is disclosed in U.S. Pat. No. 4,488,751, granted on Dec. 18, 1984, to Gunter Kling, to provide lateral protection in the door structure of an automotive vehicle. A cantilevered brace is attached to the vehicle underbody and door face plate in U.S. Pat. No. 5,110, 176, granted to Cass Curtis on May 5, 1992, to provide improved intrusion resistance upon side impacts. U.S. Pat. No. 6,877,796, issued on Apr. 12, 2005, to Takeyuki Kimura; U.S. Pat. No. 6,923,492, issued to Yuji Okazaki, et al on Aug. 2, 2005; and U.S. Pat. No. 6,926,340, issued on Aug. 9, 2005, to Yukihiro Moriyama, teach a vehicle rear door having a longitudinal impact bar formed by a pipe member and covered by a vertical reinforcement to provide intrusion resistance during lateral impacts.

In U.S. Pat. No. 6,758,491, granted on Jul. 6, 2004, to Jochem Fischer, a connecting tube extends from the A-pillar to the roof frame and serves to increase intrusion resistance when load is applied to the upper vehicle structure. Similarly, U.S. Pat. No. 7,014,249. granted to Senthil Karuppaswamy, et al on Mar. 21, 2006, is discloses a vehicle door that has an integrally formed impact beam and paddle member for increased structural rigidity, the impact beam being formed on a circular tube and extends across the door to provide protection against lateral impacts.

An impact absorbing door beam has a cylindrical inner pipe enclosed within an elliptical outer pipe, which is attached to the door, in U.S. Pat. No. 5,820,202, issued on Oct. 13, 1998, to Su-Il Ju to provide increased resistance to lateral impacts, allowing the beam to absorb impact forces more effectively without bending. In U.S. Pat. No. 6,382,707, granted on May 7, 2002, to Mark Dunneback, a reinforcement beam for an automotive door extends longitudinally across the door to provide an even load distribution during lateral impacts. The reinforcement beam is attached to brackets at opposing ends of the beam, but includes a cantilevered half portion at one attachment bracket.

A key to achieving a good rating from the IIHS testing in side impact is to distribute the impact load. Accordingly, it would be desirable to provide a device cooperable within the side door of an automotive vehicle to cause a diversion of crash energy away from the occupants in an automotive vehicle in the event of a side impact event.

SUMMARY OF THE INVENTION

It is an object of this invention to overcome the aforementioned disadvantages of the known prior art by providing an impact beam for a vehicle side door that distributes the impact load.

It is another object of this invention to provide an impact beam for deployment in a vehicle side door that includes a cantilevered member that distributes energy from an impact load to forward portions of the door.

It is a feature of this invention that the cantilevered member is projected away from the impact beam as the beam is bent during impact loading to transfer energy from the impact beam.

It is another feature of this invention that the cantilevered member is a pipe welded at one end thereof inside the hat-shaped section of an impact reinforcement beam in the vehicle door.

It is an advantage of this invention that the outwardly projecting cantilevered pipe transfers impact energy to the forward structure of the vehicle door.

It is another advantage of this invention that the inclusion of a cantilevered pipe welded inside the hat-shaped section of an impact reinforcement beam is easy to package and implement into a vehicle side door structure.

It is still another feature of this invention that the forward structure of the vehicle door inner panel is provided with a distribution block that is engaged by the outwardly projecting cantilevered pipe to receive impact energy therefrom.

It is yet another feature of this invention that the cantilevered pipe is welded at the rearward end of the door reinforcement beam and extends forwardly therefrom in a cantilevered manner.

It is still another advantage of this invention that the transfer of impact energy by the outwardly projecting cantilevered pipe transfers impact loads away from the pelvic region of the occupant to the femur region during side impact events.

It is yet another feature of this invention that the energy transfer operation of the cantilevered pipe within the formed hat-shaped reinforcement beam can be utilized in other automotive frame applications where impact energy needs to be transferred.

It is a further object of this invention to provide a side door impact reinforcement beam that is operable to transfer impact loads away from the pelvic region of the occupant of the automotive vehicle during side impacts that is durable in construction, inexpensive of manufacture, carefree of maintenance, facile in assemblage, and simple and effective in use.

These and other objects, features and advantages are accomplished according to the instant invention by providing a side door impact reinforcement beam that incorporates a cantilevered member that is welded at one end thereof internally of the impact reinforcement beam and projects forwardly thereof. Upon side impact, the bending of the impact reinforcement beam deploys the cantilevered member outwardly from within the section of the reinforcement beam to strike an energy transfer block placed on a forward portion of the inner door panel to engage the outwardly projecting cantilevered member and receive impact energy therefrom. In a preferred embodiment, the reinforcement beam has a hat-shaped cross-sectional configuration that is formed with a pipe welded at a rearward portion thereof to project forwardly to be positioned for engagement with the energy transfer block when projected outwardly during impact bending of the reinforcement beam. The energy transfer from the outwardly deploying cantilevered pipe directs impact loads away from the pelvic region of the occupant toward the femur region.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
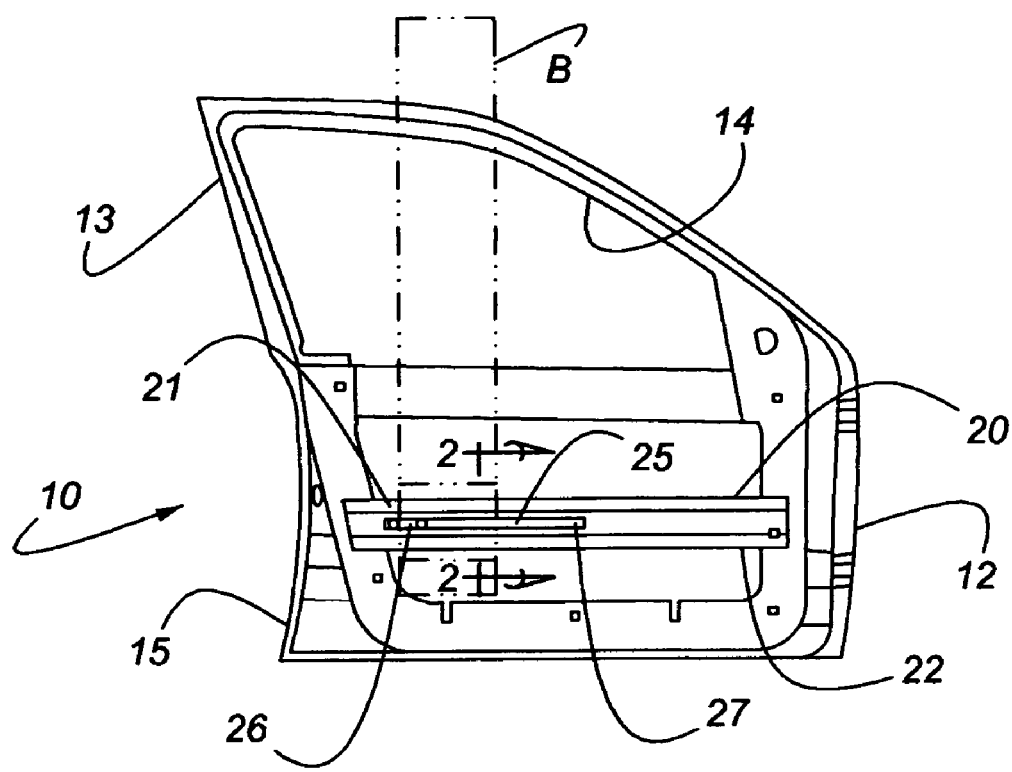
FIG. 1 is an elevational view of an automotive vehicle door having an impact reinforcement beam incorporating the principles of the instant invention, the impact barrier applying an impact load to the side door being shown in phantom.
Figure 2:
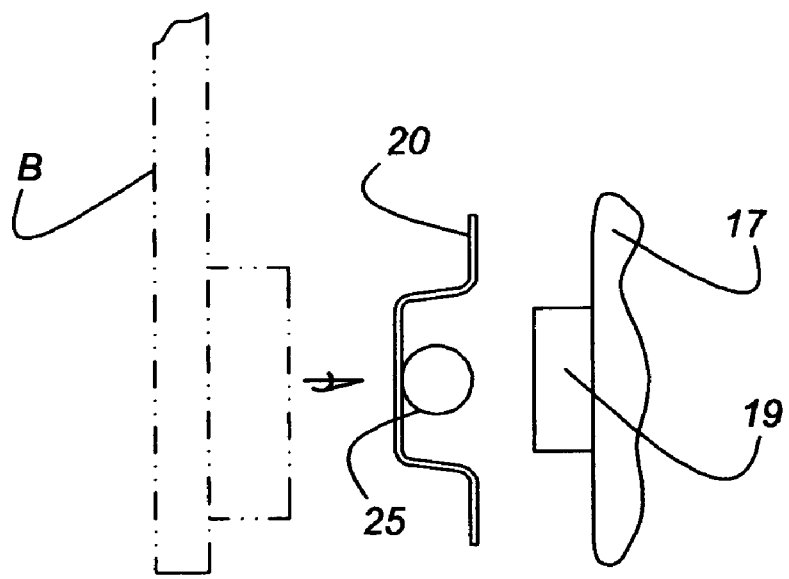
FIG. 2 is a schematic partial cross-sectional view of the impact reinforcement beam corresponding to lines 2-2 of FIG. 1, the impact barrier being shown in phantom.

Referring to FIGS. 1 and 2, an automotive side door incorporating the principles of the instant invention can best be seen. The door 10 is formed with a frame 12 having an upper portion 13 which is typically exposed and incorporates a window opening 14, and a lower portion 15 that is typically covered by an inner door panel 17 and supports a number of conventional operative functions, such as a window movement mechanism and drive mechanism, speakers for the automobile's audio system, and operative controls for the window, door locks, mirror adjustment, etc. The lower portion 15 of the door 10 typically includes a longitudinally extending impact reinforcement beam 20 that spans the door frame 12 and provides some resistance to the intrusion of an object into the passenger compartment (not show) adjacent to the door inner panel 17. Typically, the rearward end 21 of the impact reinforcement beam 20 corresponds generally to the pelvic region of the occupant (not shown) on the seat in the passenger compartment next to the door 10.

The impact reinforcement beam can be formed in many conventional shapes, though one preferred shape is a hat-shaped cross-sectional configuration, such as is depicted in FIG. 2, which provides a strong, rigid beam 20 extending longitudinally forward on the door frame 12 from the rearward end 21. Within the interior cavity formed by the hat-shaped beam 20, a longitudinally extending pipe 25 is welded to the rearward end 21 of the impact reinforcement beam 20 in a manner that the pipe 25 is only welded at the rearward fixed end 26 thereof to the reinforcement beam 20 such that the forward free end 27 is unattached. Thus, the pipe 25 extends in a cantilevered manner from the rearward end 27 which is affixed to the rearward end 21 of the reinforcement beam 20. The forward free end 27 of the cantilevered pipe 25 is aligned with an energy transfer block 19 formed on the interior side of the door inner panel 17.

The cantilevered pipe 25 terminates at the forward free end 27, which is longitudinally rearwardly of the forward end 22 of the impact reinforcement beam 20 that is affixed to the door frame 12. Thus, when the impact reinforcement beam 20 receives a side impact load from the impact barrier B, causing the reinforcement beam 20 to bend from the energy transmitted thereto by the impact barrier B, the forward free end 27 of the cantilevered pipe 25 is free to project outwardly from the reinforcement beam 20 and strike the aligned energy transfer block 19 to transfer some of the impact energy into the energy transfer block 19, which is located forwardly of the pelvic region of the occupant in the passenger compartment and, generally, aligns with the femur region of the occupant.

Figure 3:
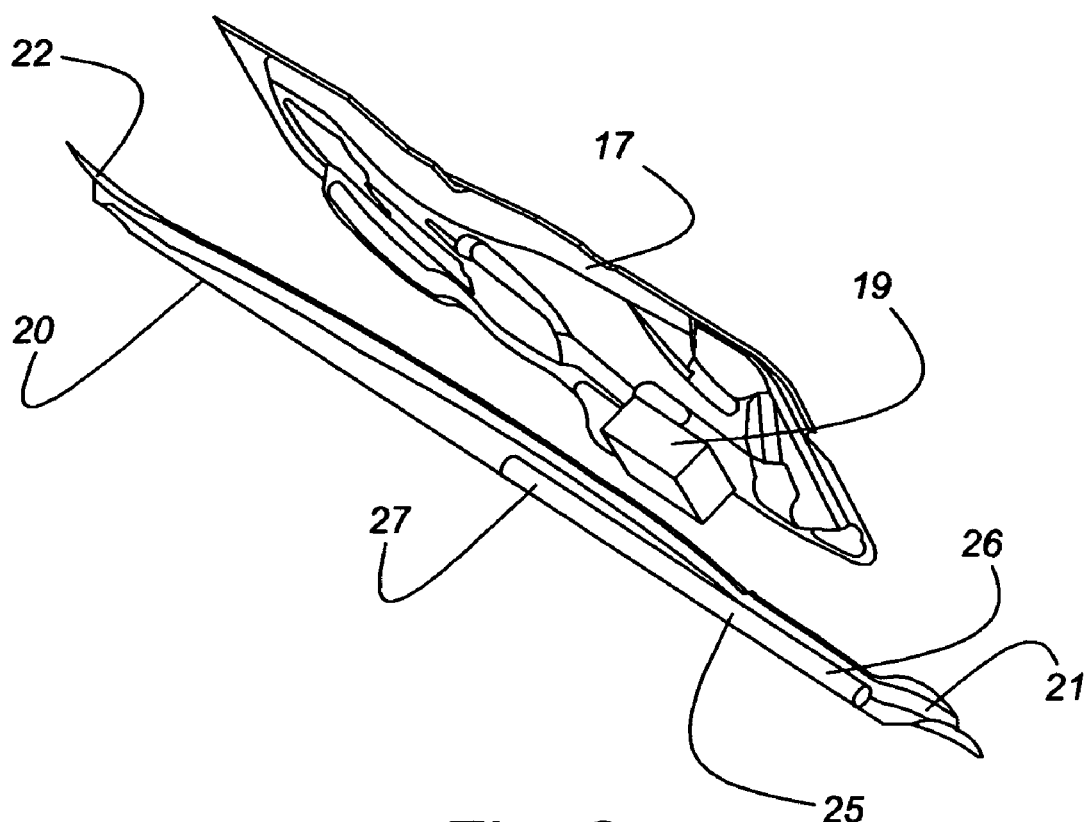
FIG. 3 is a schematic perspective view of the impact reinforcement beam incorporating the principles of the instant invention and the associated inner door panel having an energy transfer block mounted thereon, and showing the relationship therebetween prior to receiving a side impact load.
Figure 4:
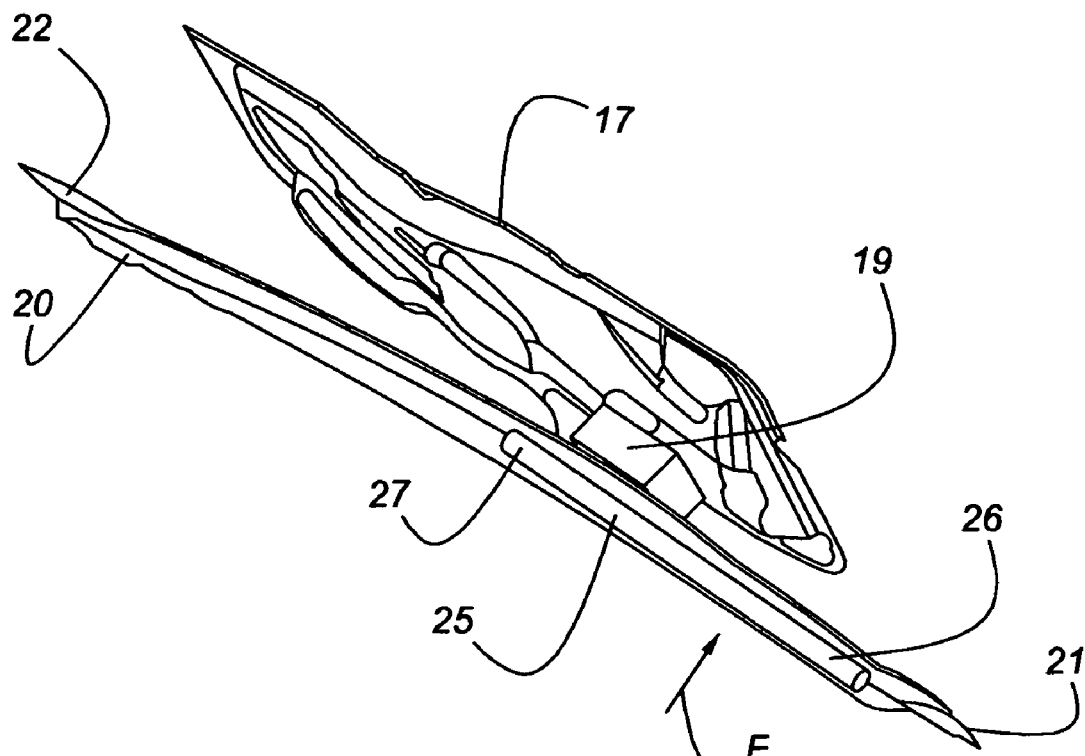
FIG. 4 is a schematic perspective view of the impact reinforcement beam and inner door panel as depicted in FIG. 3, but showing the first stage of bending of the reinforcement beam at about 5 milliseconds after side impact has been initiated.

This energy transfer operation is reflected in FIGS. 3-7. In FIG. 3, the relationship of the components prior to the impact of the barrier B is that the cantilevered pipe 25 is nested within the cavity of the impact reinforcement beam 20 affixed at the rearward fixed end 26 thereof to the rearward end 21 of the reinforcement beam 20. The energy transfer block 19 is mounted on the interior side of the door inner panel 17 in transverse alignment of the forward free end 27 of the cantilevered pipe 25. In FIG. 4, the impact barrier has engaged the side of the vehicle at the pelvic region of the occupant and, therefore, strikes at substantially the rearward end 21 of the reinforcement beam 20, causing the reinforcement beam to bend inwardly toward the passenger compartment as the reinforcement beam begins to absorb the load imposed by the impact barrier B. The initial bending of the reinforcement beam 20, as is reflected in FIG. 4, begins at about 5 milliseconds into the side impact crash event.

Figure 5:
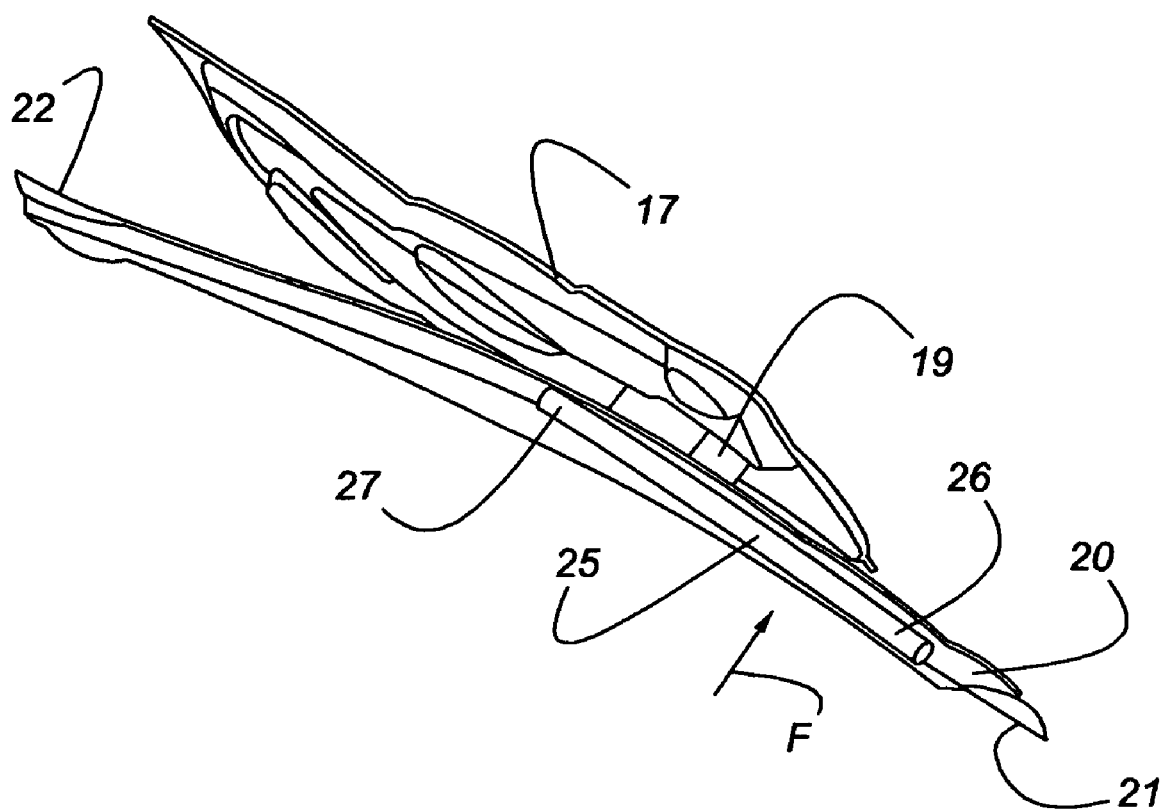
FIG. 5 is a schematic perspective view of the impact reinforcement beam and inner door panel as depicted in FIG. 3, but depicting the continued bending of the impact reinforcement beam and the beginning of the outward deployment of the cantilevered member at about 10 milliseconds after side impact has been initiated.

At about 10 milliseconds into the side impact crash event, as is represented in FIG. 5, the reinforcement beam 20 continues to absorb the energy of the side impact barrier by continuing to bend inwardly toward the door inner panel 17, the application of the side impact load imposed by the barrier B being represented by the arrow F. The bending movement of the reinforcement beam 20, due to the cantilevered nature of the pipe 25 affixed only at the rearward fixed end 26 thereof, causes the free forward free end 27 of the pipe 25 to deploy inwardly and project out of the cavity of the reinforcement beam 20.

Figure 6:
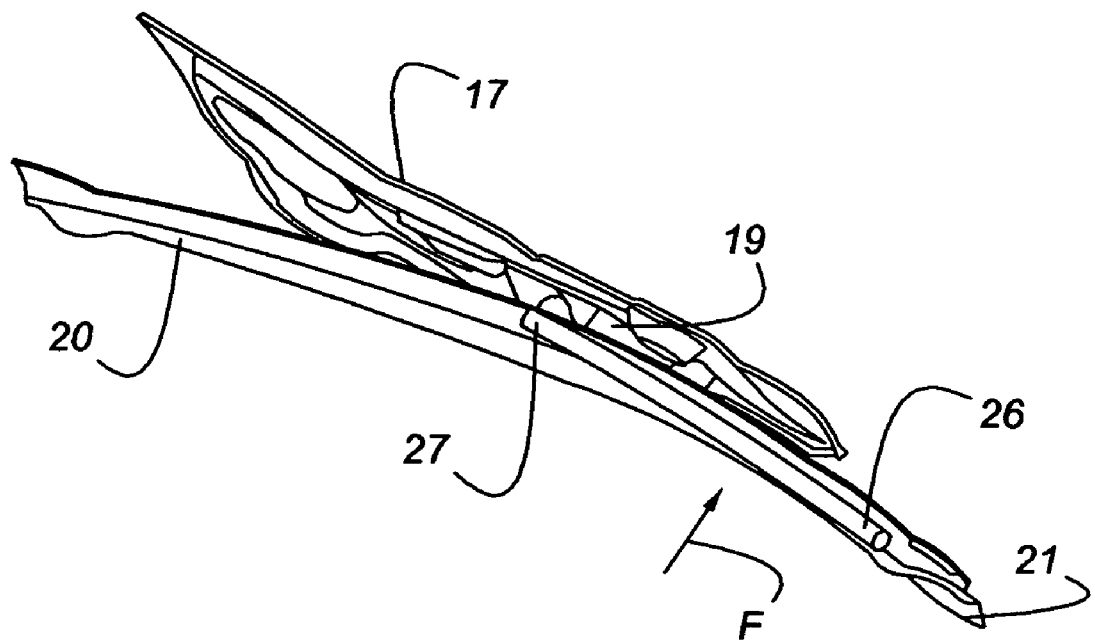
FIG. 6 is a schematic perspective view of the impact reinforcement beam and inner door panel as depicted in FIG. 3, but depicting the outward deployment of the cantilevered member into engagement with the energy transfer block at about 15 milliseconds after side impact has been initiated.
Figure 7:
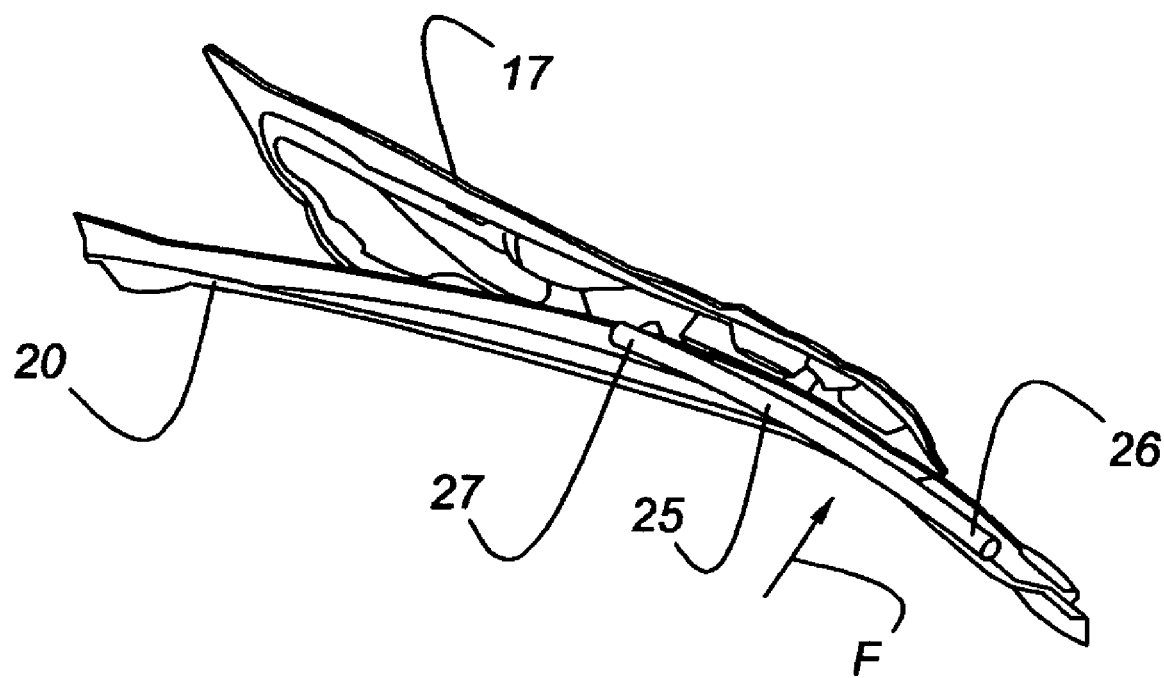
FIG. 7 is a schematic perspective view of the impact reinforcement beam and inner door panel as depicted in FIG. 3, but depicting the transfer of impact load into the energy transfer block by the outwardly projected cantilevered member at about 20 milliseconds after side impact has been initiated.

At about 15 milliseconds into the side impact crash event, as is represented in FIG. 6, the inwardly projecting forward free end 27 of the pipe 25 strikes the energy transfer block 19, which is located forwardly of the pelvic region of the occupant. The inwardly deploying forward free end 27 of the pipe 25 transfers the energy causing the inward deployment of the forward free end 27 into the energy transfer block 19, and from there into the door inner panel 17 forwardly of the pelvic region of the occupant. In FIG. 7, the energy transfer block 19 has collapsed into the door inner panel 17, having absorbed the energy transferred thereto by the deploying forward free end 27 of the pipe 25, which has diverted a portion of the impact load to the forward structure of the door 10 away from the pelvic region of the occupant.

One of ordinary skill in the art will recognize that the concept of a cantilevered energy transfer member mounted inside of a frame member undergoing a bending deformation during impact loading to transfer a portion of the impact load away from the point of impact can be used in other applications within an automobile.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, the cross-sectional shape of the impact reinforcement beam 20 does not have to be hat-shaped, or even define an interior cavity like a C-section beam within which the cantilevered energy transfer member 25 can be affixed. Furthermore, the cantilevered energy transfer member 25 can have a shape other than a pipe. From a broad aspect of this invention, the bending of the reinforcement beam 20 upon impact is operable, due to the cantilevered mounting of the member 25, to project the cantilevered energy transfer member 25 away from the reinforcement beam 20 to transfer a portion of the impact energy forwardly into the door structure away from the pelvic region of the occupant. The energy transfer block 19 is a preferred embodiment for use with the cantilevered energy transfer member 25; however, the energy transfer block 19 is not necessary if the projecting cantilevered energy transfer member 25 can impact other structure within the door 10 that would be operable to permit a transfer of a portion of the impact load away from the point of impact.

Having thus described the invention, what is claimed is:

1. An impact reinforcement beam assembly for use in an automotive vehicle door, comprising:

a beam member having a cross-sectional shape with a rearward end and a forward end adapted to be affixed to said door at longitudinally spaced positions; and an energy transfer member having a fixed end secured to said beam member at one of said rearward end and said forward end to extend therefrom in a cantilevered manner from said fixed end toward the other of said rearward end and said forward end.

2. The impact reinforcement beam assembly of claim 1 wherein said cross-sectional shape of said beam member defines a cavity in which said energy transfer member is affixed.

3. The impact reinforcement beam assembly of claim 2 wherein said energy transfer member is affixed on said beam member at a location corresponding to an occupant pelvic region.

4. The impact reinforcement beam assembly of claim 3 wherein said energy transfer member has a distal free end oriented forwardly of said fixed end.

5. The impact reinforcement beam assembly of claim 4 wherein said energy transfer member is a pipe.

6. The impact reinforcement beam assembly of claim 3 wherein said beam member is operable to bend upon an application of a localized side impact load applied thereto at substantially said fixed end of said energy transfer member, said distal free end of said energy transfer member projecting outwardly of said beam member upon said beam member bending to transfer a portion of the energy from said impact load forwardly of said fixed end of said energy transfer member.

7. The impact reinforcement beam assembly of claim 6 wherein said fixed end is welded to said rearward end of said beam member.

8. A door on an automotive vehicle, comprising:

a frame having an upper portion and a lower portion;

a reinforcement beam having a rearward end and a forward end affixed, respectively, to said frame at longitudinally spaced positions, said frame having a cross-sectional shape;

an energy transfer member having a fixed end connected to said reinforcement beam at said rearward end and a distal free end extending forwardly from said fixed end; and a door inner panel mounted on said frame adjacent to said reinforcement beam.

9. The door of claim 8 wherein said beam member is operable to bend upon an application of a localized side impact load applied thereto at substantially said fixed end of said energy transfer member, said distal free end of said energy transfer member projecting outwardly of said beam member upon said beam member bending to transfer a portion of the energy from said impact load to said door inner panel.

10. The door of claim 9 wherein said cross-sectional shape of said beam member defines a cavity in which said energy transfer member is affixed.

11. The door of claim 10 wherein said cross-sectional shape is a hat-section, said energy transfer member being a pipe.

12. The door of claim 10 wherein door inner panel is formed with an energy transfer block positioned for engagement with said distal free end of said energy transfer member upon a bending of said reinforcement beam.

13. The door of claim 12 wherein said fixed end of said energy transfer member is affixed to a location on said reinforcement beam that corresponds to a pelvic region of an occupant of said automotive vehicle.

14. The door of claim 13 wherein said distal free end transfers a portion of the energy of said impact load forwardly of said pelvic region.

15. A method of managing impact energy from a localized side impact load imposed on an automotive vehicle door having a longitudinally extending reinforcement beam therein, said reinforcement beam having a rearward end and a forward end connected to said vehicle door at longitudinally spaced positions, comprising the steps of:

providing an energy transfer member having a fixed end secured to said reinforcement beam at one of said rearward end and said forward end and a cantilevered distal free end extending toward the other of said rearward end and said forward end;

projecting said distal free end of said energy transfer member away from said reinforcement beam in response to a bending of said reinforcement beam upon the imposition of said localized side impact load applied thereon at substantially said fixed end of said energy transfer member; and impacting said distal free end into remote structure of said door to transfer a portion of said impact energy from said side impact load to said remote structure.

16. The method of claim 15 wherein providing step includes the step of:

welding said fixed end of said energy transfer member to said rearward end of said reinforcement beam so that said distal free end extends in a forward direction from said fixed end.

17. The method of claim 16 wherein said remote structure is an energy transfer block mounted on a door inner panel, said impacting step including the step of:

striking said energy transfer block with said distal free end of said energy transfer member to transfer said portion of said impact energy thereto.

18. The method of claim 17 wherein said impacting step transfers said portion of said impact energy forwardly of a pelvic region of an occupant located adjacent said automotive vehicle door.

19. The method of claim 18 wherein said energy transfer member is a pipe affixed to said reinforcement beam having a hat-shaped cross-sectional configuration defining a cavity within which said pipe is affixed to said reinforcement beam, said providing step positioning said pipe within said cavity so that all external dimensions of said reinforcement beam are not changed.

* * * * *